(12) United States Patent
Sakai

(10) Patent No.: US 8,126,309 B2
(45) Date of Patent: Feb. 28, 2012

(54) VIDEO PLAYBACK APPARATUS AND METHOD

(75) Inventor: Tetsuya Sakai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1053 days.

(21) Appl. No.: 12/029,320

(22) Filed: Feb. 11, 2008

(65) Prior Publication Data

US 2008/0205851 A1 Aug. 28, 2008

(30) Foreign Application Priority Data

Feb. 19, 2007 (JP) ................................. 2007-038658

(51) Int. Cl.
*H04N 5/76* (2006.01)
*H04N 9/80* (2006.01)
*H04N 5/783* (2006.01)

(52) U.S. Cl. .... 386/239; 386/241; 386/351; 386/E5.001

(58) Field of Classification Search .................... None
See application file for complete search history.

(56) References Cited

U.S. PATENT DOCUMENTS

| | | | | |
|---|---|---|---|---|
| 2004/0080609 A1* | 4/2004 | Kakii et al. | ................. | 348/14.08 |
| 2007/0124752 A1 | 5/2007 | Sakai | ................. | 725/8 |
| 2007/0136755 A1 | 6/2007 | Sakai | ............... | 725/46 |

FOREIGN PATENT DOCUMENTS

| | | |
|---|---|---|
| JP | 3268545 | 1/2002 |
| JP | 2002-262268 | 9/2002 |
| WO | WO 2005117431 A1 * | 12/2005 |

* cited by examiner

*Primary Examiner* — Nasser Moazzami
*Assistant Examiner* — Fatoumata Traore
(74) *Attorney, Agent, or Firm* — Ohlandt, Greeley, Ruggiero & Perle, L.L.P.

(57) ABSTRACT

A video playback apparatus includes a data-storage unit storing video data and a first video-time stamp, an information-storage unit storing first-associated information and a first-associated-time stamp, a unit acquiring plural playback-video data and plural second-video-time stamps of the plural playback-video data from the data-storage unit, and acquiring second-associated information of the playback-video data and a second-associated-time stamp of the second-associated information from the information-storage unit, a unit measuring information amounts of the playback-video data of the second-video-time stamps to obtain a smallest information amount of the information amounts, a unit detecting a time-stamp section corresponding to the smallest information amount, a unit changing the second-associated-time stamp to generate a changed time stamp, the second-associated information being presented in the time-stamp section by the changed time stamp, and a unit presenting the second-associated information together with the playback-video data based on the changed time stamp.

6 Claims, 8 Drawing Sheets

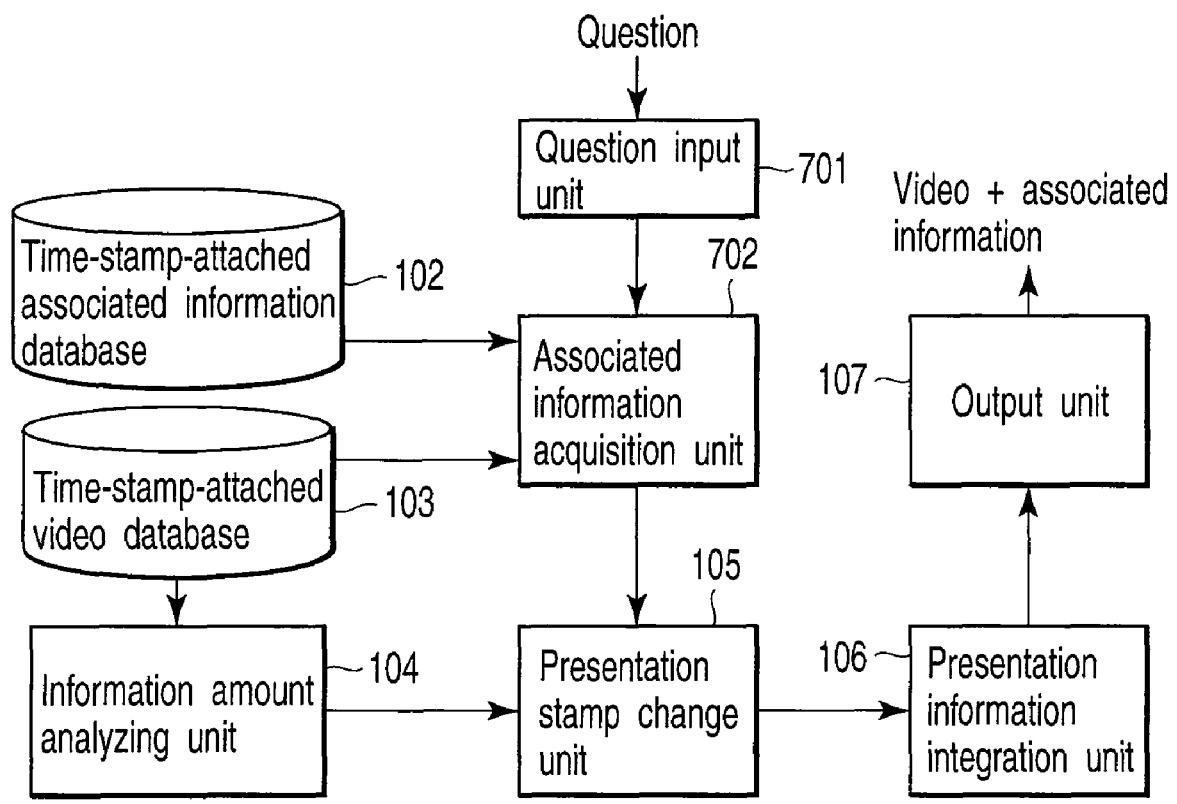
F I G. 7

VIDEO PLAYBACK APPARATUS AND METHOD

CROSS-REFERENCE TO RELATED APPLICATIONS

This application is based upon and claims the benefit of priority from prior Japanese Patent Application No. 2007-038658, filed Feb. 19, 2007, the entire contents of which are incorporated herein by reference.

BACKGROUND OF THE INVENTION

1. Field of the Invention

The present invention relates to a video playback apparatus and method of presenting a video together with associated information.

2. Description of the Related Art

In recent years, video images of TV programs and movies can be played back by a variety of devices such as a personal computer, TV set, DVD player, and portable phone. A video is an aggregation of various kinds of medium information including video data displayed on a screen, voice and sound data, and text data called a closed caption which originally accompanies video for persons with hearing handicaps.

A system has recently been proposed, which adds information associated with a video to the video image and simultaneously presents them (e.g., Japanese Patent No. 3268545 and JP-A 2002-262268 [KOKAI]). This watching method is expected to be popular in the further as the quantity of video information increases steadily. That is, a user watches a video and simultaneously reads associated information, thereby efficiently acquiring information.

However, if associated information is presented together with a video, as in Japanese Patent No. 3268545 and JP-A 2002-262268 (KOKAI), it is difficult for the user to grasp all pieces of presented information because the amount of information presented at once is too large. Even if it is possible to acquire all pieces of presented information, the user must frequency move eyes between the video and associated information, and the load on him/her is heavy.

For example, when a video containing a large quantity of character information such as a character overlay is played back, and text information is simultaneously displayed on a side of the screen as associated information, the user is forced to read a lot of texts in a short time. Similarly, if associated information is displayed on a side of the screen while the contents of a video that is being played back are very quickly changing, the user overlooks the associated information at a high probability because it can hardly attract his/her attention.

To reduce the information amount, conventionally, video playback itself is paused and then resumed after the user reads associated information. However, this watching method cannot achieve the original purpose of efficiency acquiring information in a limited time.

BRIEF SUMMARY OF THE INVENTION

In accordance with a first aspect of the invention, there is provided a video playback apparatus comprising: a data storage unit configured to store video data and a first video time stamp which corresponds to a playback time to play back the video data; an information storage unit configured to store first associated information and a first associated time stamp, the first associated information being related to the video data, and the first associated time stamp corresponding to a playback time to play back the first associated information; a data acquisition unit configured to acquire plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp; a measurement unit configured to measure a plurality of information amounts of the playback video data of the second video time stamps to obtain a smallest information amount of the information amounts; a detection unit configured to detect a time stamp section corresponding to the smallest information amount; a change unit configured to change the second associated time stamp to generate a changed time stamp, the second associated information being presented in the time stamp section by the changed time stamp; and a presentation unit configured to present the second associated information together with the playback video data on the basis of the changed time stamp.

In accordance with a second aspect of the invention, there is provided a video playback apparatus comprising: a data storage unit configured to store video data and a first video time stamp which corresponds to a playback time to play back the video data; an information storage unit configured to store first associated information and a first associated time stamp, the first associated information being related to the video data, and the first associated time stamp corresponding to a playback time to play back the first associated information; a data acquisition unit configured to acquire plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp; a decision unit configured to decide to present the second associated information by at least one of text and voice; and a presentation unit configured to present the playback video data and the second associated information on the basis of the second associated time stamp and the second video time stamps.

BRIEF DESCRIPTION OF THE SEVERAL VIEWS OF THE DRAWING

FIG. 7 is a block diagram of a video playback apparatus according to the second embodiment;

DETAILED DESCRIPTION OF THE INVENTION

A video playback apparatus and method according to the embodiments of the present invention will be described below in detail with reference to the accompanying drawing.

According to the video playback apparatus and method of the embodiments, it is possible to reduce the load on a user in watching when associated information is presented simultaneously with video playback.

First Embodiment

Figure 1:
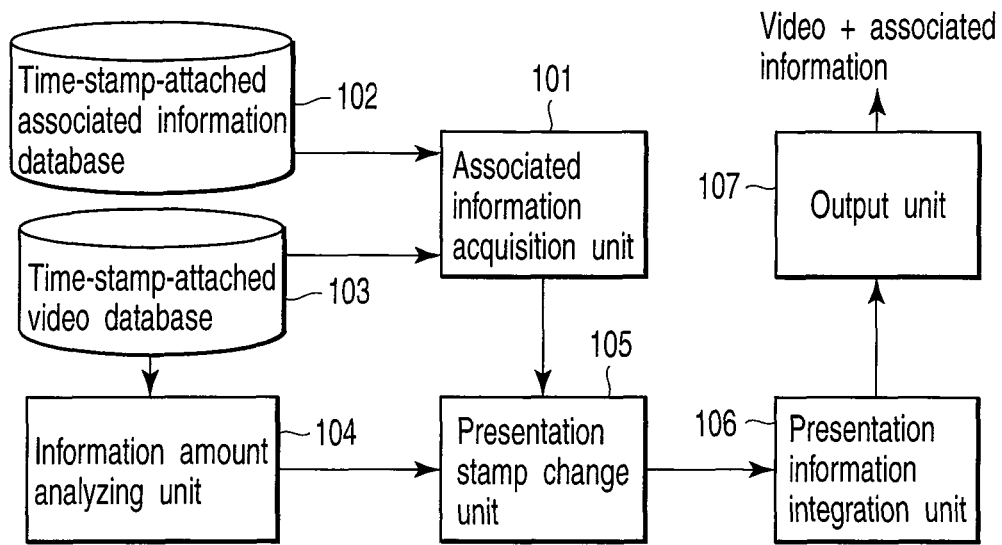
FIG. 1 is a block diagram of a video playback apparatus according to the first embodiment.

FIG. 1 is a block diagram showing the schematic arrangement of a video playback apparatus according to the first embodiment.

The video playback apparatus according to this embodiment includes an associated information acquisition unit 101, time-stamp-attached associated information database 102, time-stamp-attached video database 103, information amount analyzing unit 104, presentation stamp change unit 105, presentation information integration unit 106, and output unit 107.

The time-stamp-attached associated information database 102 stores associated information associated with the contents of video data, and time stamps corresponding to the playback times of the associated information. Each video data item generally has a plurality of pieces of associated information.

The time-stamp-attached video database 103 stores video data, and time stamps corresponding to the playback times of the video data items. Each video data item contains data representing only a video, and at least one of voice information, sound information, and closed caption associated with the data.

The associated information acquisition unit 101 acquires, on the basis of a playback instruction from a user, video data corresponding to the playback instruction and a time stamp corresponding to the video data from the time-stamp-attached video database 103, and then acquires associated information corresponding to the time stamp and a time stamp corresponding to the associated information from the time-stamp-attached associated information database 102. That is, the associated information acquisition unit 101 acquires the associated information of playback target video and the time stamp of the associated information.

The information amount analyzing unit 104 measures the information amount of the video data acquired by the associated information acquisition unit 101.

The presentation stamp change unit 105 detects a time section with the minimum information amount on the basis of the video data information amount measured by the information amount analyzing unit 104 and changes the time stamp of the associated information acquired by the associated information acquisition unit 101 such that the time stamp falls within the detected time section with the minimum information amount.

On the basis of the changed associated time stamp and the acquired video time stamp, the presentation information integration unit 106 links the video data with the associated information to present the acquired video data and acquired associated information.

The output unit 107 outputs the video and associated information received from the presentation information integration unit 106 to the screen. The output unit 107 corresponds to the display screen of, e.g., a TV set or personal computer.

The process sequence of the associated information acquisition unit 101, presentation stamp change unit 105, and presentation information integration unit 106 will be described below.

Figure 2:
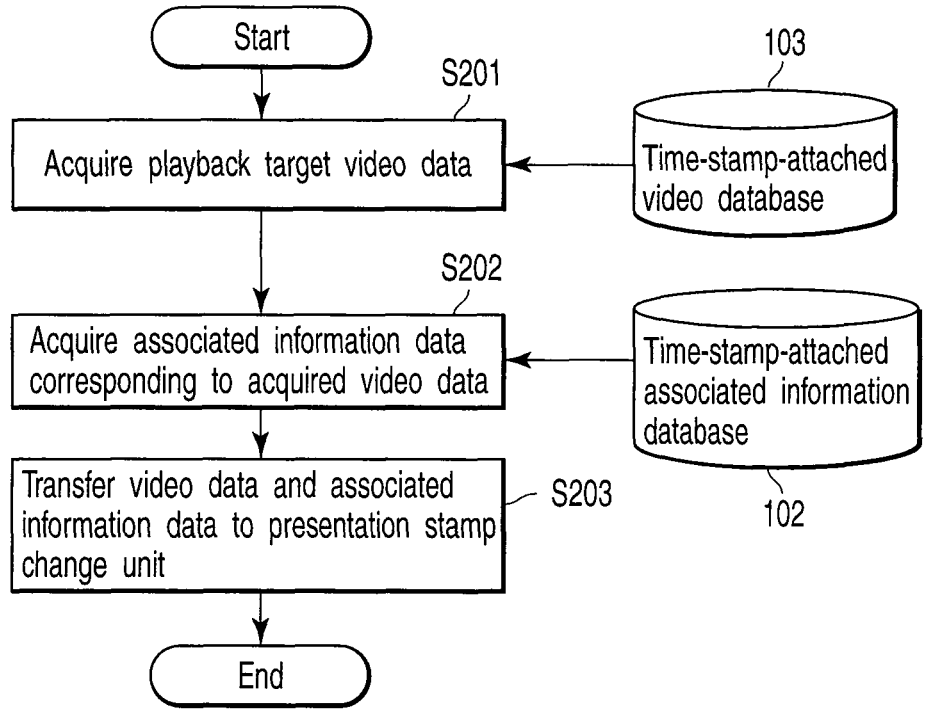
FIG. 2 is a flowchart illustrating an example of the operation of an associated information acquisition unit in FIG. 1.

FIG. 2 illustrates an example of the process sequence of the associated information acquisition unit according to the first embodiment.

First, the associated information acquisition unit 101 acquires, from the time-stamp-attached video database 103, the video data of video designated by user as a playback target (step S201). The video data indicates, e.g., a TV program recorded on an optical disk or in a hard disk recorder, a TV program that is being received currently, or a video distributed through the Internet.

The associated information acquisition unit 101 acquires associated information corresponding to the acquired video data from the time-stamp-attached associated information database 102 (step S202). The associated information indicates text data or image data defined for a specific section (a pair of start point and end point) of a video. For example, for a section where an actor appears in a video, text data representing the profile of the actor and the image data of his facial portrait are prepared in the time-stamp-attached associated information database 102 in advance as associated information associated with a time stamp. The definition of a term used in a video can also be prepared in advance as associated information. Note that a broadcaster transmits associated information in some cases.

Finally, the associated information acquisition unit 101 transfers the video data and associated information data to the presentation stamp change unit 105 (step S203).

In the above-described example, associated information corresponding to a video is registered in advance as associated information data. However, the associated information acquisition unit 101 may acquire associated information by dynamically searching an external knowledge source using video information. For example, when video data contains a closed caption, a keyword is extracted from the closed caption by morphological analysis, and a search is executed using an Internet search engine. The obtained search result can be acquired as associated information. Note that a closed caption contains a time stamp and text information. The text information indicates, e.g., caption data or narration data. The narration data is an aggregate of lines, and each line has the name of a player at its head. A closed caption is acquired in correspondence with a time stamp. However, the associated information acquisition method, i.e., whether to prepare associated information in advance or dynamically search it is not the gist of the embodiment.

Figure 3:
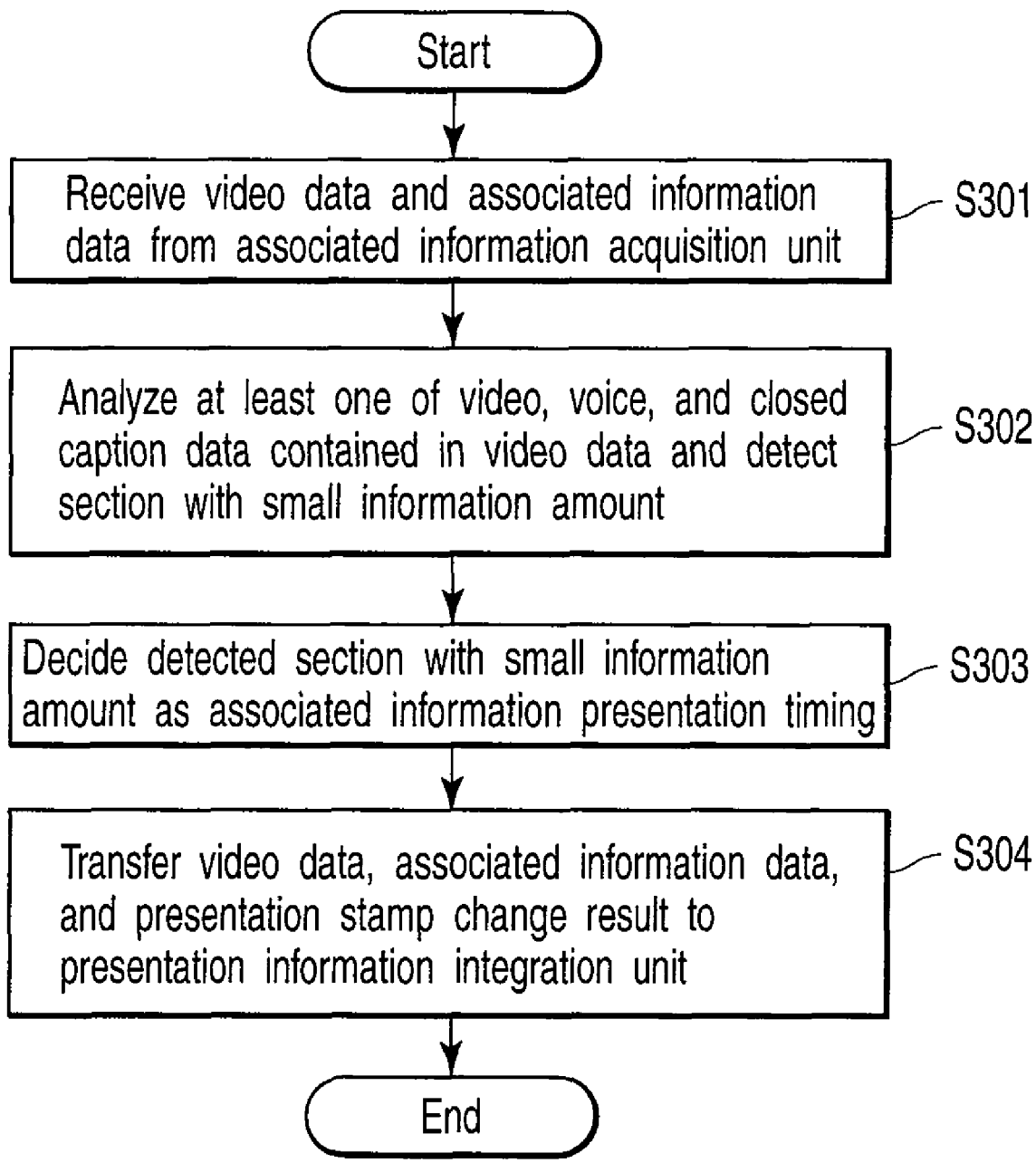
FIG. 3 is a flowchart illustrating an example of the operations of an information amount analyzing unit and a presentation stamp change unit in FIG. 1.

FIG. 3 illustrates an example of the process sequence of the presentation stamp change unit 105 and information amount analyzing unit 104 according to the first embodiment.

First, the presentation stamp change unit 105 receives video data and corresponding associated information data from the associated information acquisition unit 101 (step S301). Next, the information amount analyzing unit 104 analyzes at least one of video information, voice information, sound information, and closed caption data contained in the video data acquired by the associated information acquisition unit 101. The presentation stamp change unit 105 acquires the analysis result from the information amount analyzing unit 104 and detects a section with a small information amount (step S302). For example, to detect a section with a small information amount on the basis of video data, the similarity between image frames is obtained by comparing them (e.g., the difference between frames is calculated). A section with a high similarity is regarded as a section with a small information amount. This is because a high similarity between frames indicates that similar contents such as a scene from a fixed camera angle are presented to the user for a long time. For content with a character overlay (e.g., text overlaid on a video) displayed in a video, character overlay detection is executed. A section without character overlay display is regarded as a section with a small information amount.

To detect a section with a small information amount on the basis of audio data (including voice information and sound information), a section with a small voice or sound volume is regarded as a section with a small information amount. Alternatively, a section without an utterance of a person is detected by using voice/non-voice recognition or speaker recognition technology and regarded as a section with a small information amount.

To detect a section with a small information amount on the basis of a closed caption, the text data of a closed caption is subjected to morphological analysis, word frequencies are totalized on a time axis, and a section with a relatively small number of words, i.e., a section with little narration or utterance of players is regarded as a section with a small information amount. Some of the above-described methods of detecting a section with a small information amount may, of course, be combined.

The presentation stamp change unit 105 detects a section with a small information amount by the above-described process and decides the presentation timing of associated information during video playback (step S303). That is, the presentation stamp change unit 105 decides how to change the associated information presentation timing. The presentation stamp change unit 105 transfers the video data, associated information data, and presentation timing change result to the presentation information integration unit 106 (step S304).

Figure 4:
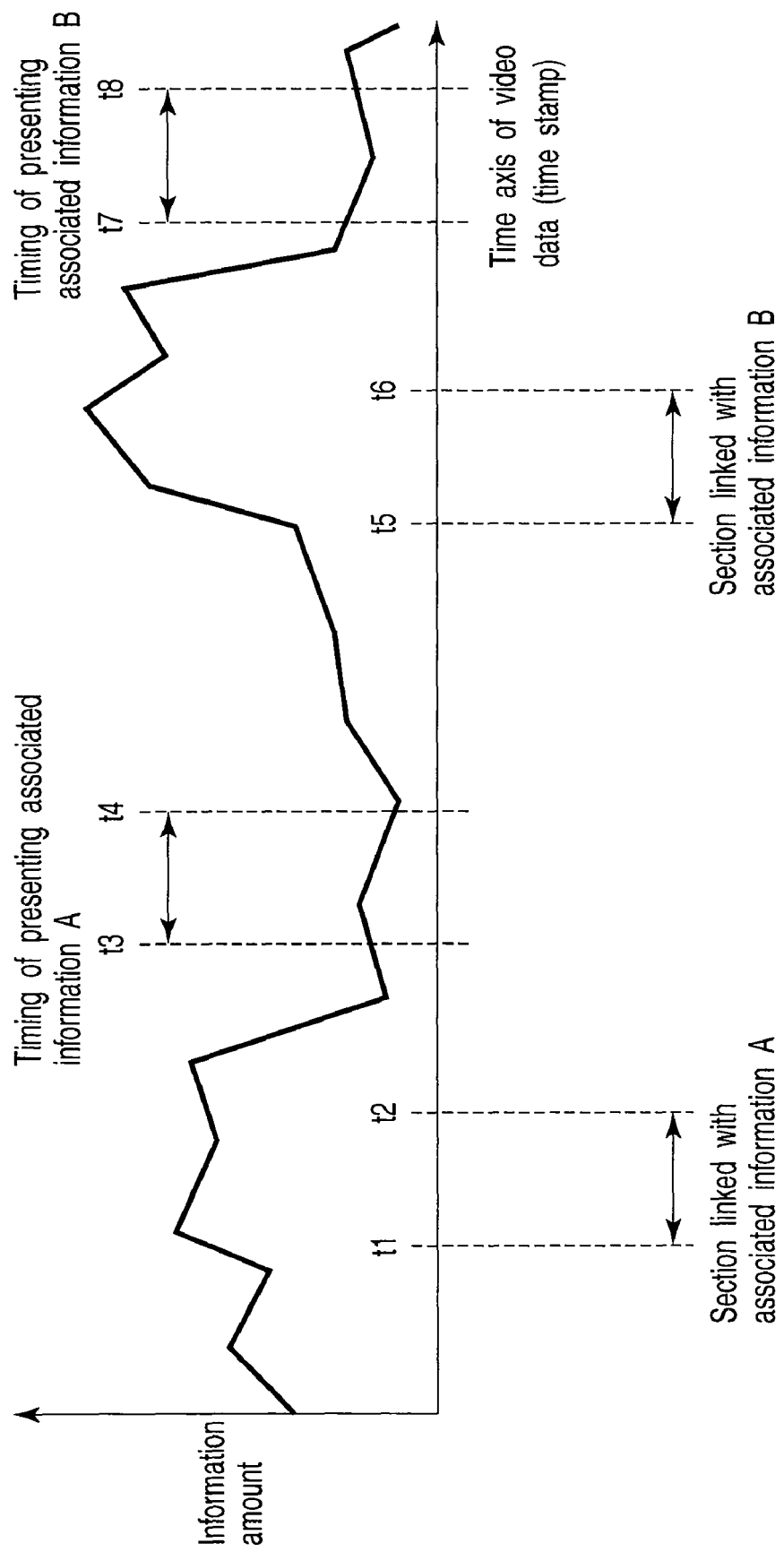
FIG. 4 is a view showing the concept of a detection result of a section with a small information amount and a presentation stamp change result.

FIG. 4 is a view showing the concept of the detection result of a section with a small information amount and the presentation stamp change result. In FIG. 4, the horizontal axis represents the time axis (representing a time stamp) of a playback target video, and the vertical axis represents the information amount. The line indicates a result obtained by estimating the information amount at each point of time by the above-described method and expressing the information amount as a numerical value.

In this line graph, each section corresponding to a valley is the above-described section with a small information amount, i.e., a section with little movement or a small number of character overlays, a section with a small volume, or a section with less utterances in a video. For example, associated information A has a start time t1 and an end time t2. This indicates that the associated information A is linked with the video section from t1 to t2. For example, when an actor appears in video in the section from t1 to t2, the associated information A is, e.g., the profile information of the actor.

In this embodiment, instead of simply displaying the associated information A from t1, a timing with a smaller information amount is detected, and the associated information A is presented in a section from, e.g., t3 to t4 in FIG. 4. That is, the presentation timing of the associated information A is changed. This is because, for example, even when the associated information is simply presented between t1 and t2, the video itself has a large information amount in this section, and the user may have difficulties in grasping the information in the video and the associated information simultaneously. In, e.g., a scene where an actor is active, the user focuses on the video, and he/she cannot look at and read the actor's profile presented as associated information.

In the above example, for example, the actor appears in the section from t1 to t2, and associated information about the actor is presented slightly later from t3. If the interval between t2 and t3 is too long, the user may be unable to easily recognize the association between the actor and associated information. In this case, for example, if the difference between t2 and t3 exceeds a predetermined value, the system may flexibly decide the presentation timing and present the associated information immediately after t1, faithfully complying with the section linked with the associated information A. In the above-described case, the actual presentation timing is later than the timing linked with the associated information (the presentation timing is shifted later). However, whether the timing is set earlier or later is not particularly limited. For example, the profile of a leading character may be presented before his/her appearance in a video.

Figure 5:
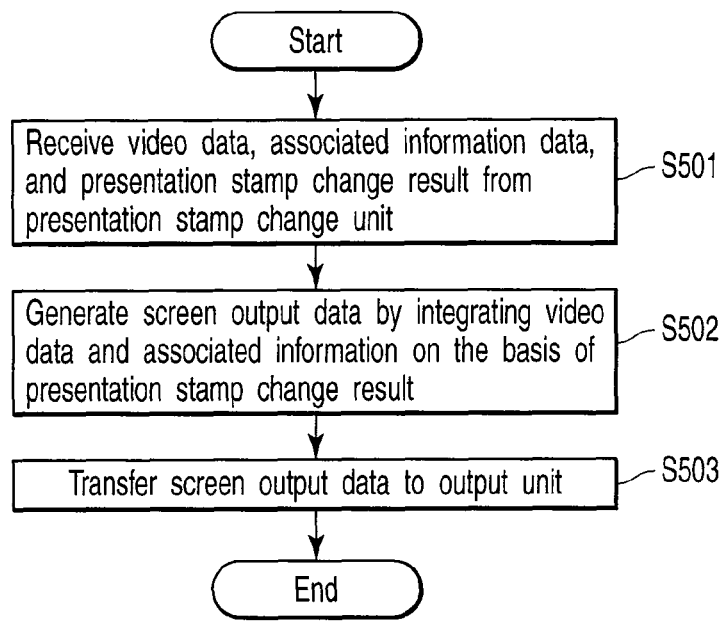
FIG. 5 is a flowchart illustrating an example of the operations of a presentation information integration unit in FIG. 1.

FIG. 5 illustrates an example of the process sequence of the presentation information integration unit 106 according to the first embodiment.

Figure 6:
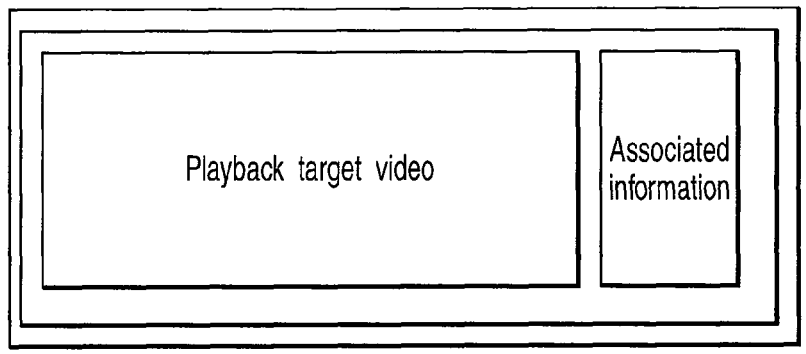
FIG. 6A is a view showing a display example of screen output data generated by the presentation information integration unit in FIG. 1.
FIG. 6B is a view showing another display example of screen output data generated by the presentation information integration unit in FIG. 1.
Figure 6:
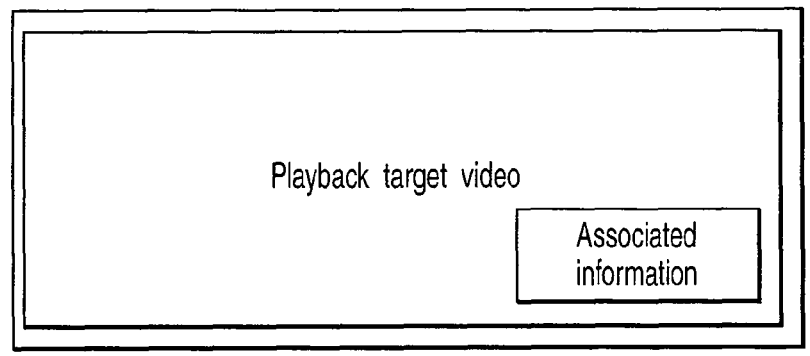

The presentation information integration unit 106 receives video data, associated information data, and presentation stamp change result from the presentation stamp change unit 105 (step S501) and generates screen output data by integrating the video data and associated information data on the basis of the presentation stamp change result (step S502). More specifically, the presentation information integration unit 106 generates screen output data capable of presenting a playback target video and associated information simultaneously, as shown in FIG. 6A to 6B. In the example shown in FIG. 6A, associated information is added next to a video. In the example shown in FIG. 6B, associated information is overlaid on a video. Display in FIG. 6A is suitable for a video with character overlay, e.g., a news program. Display in FIG. 6B is suitable for a video without character overlay. However, the main object of this embodiment is not to provide such a detailed presentation method but to present associated information at a timing with a small information amount in a video, as described above. Finally, the presentation information integration unit 106 sends these data to an output unit such as a display (step S503).

According to the above-described first embodiment, the video playback apparatus for presenting associated information simultaneously with video playback controls the amount of information presented to the user at once and the medium of the information so that the user can easily grasp the presented information without overlooking any information, and the load on the user in watching can be reduced.

Second Embodiment

FIG. 7 is a block diagram showing the schematic arrangement of a video playback apparatus according to the second embodiment.

The arrangement of the second embodiment is different from that of the first embodiment in that the apparatus has a question input unit 701 including, e.g., a microphone or keyboard as hardware. More specifically, in the first embodiment, the timing of presenting the associated information of a playback target video is decided independently of a user's question. In the second embodiment, the timing of presenting associated information corresponding to a question input by a user during video playback is decided.

Only the process sequence of an associated information acquisition unit 702 whose process contents slightly change from the first embodiment in that it receives a question from a user will be described below. The same reference numerals as in the above-described apparatus denote the same parts, and a description thereof will not be repeated.

Figure 8:
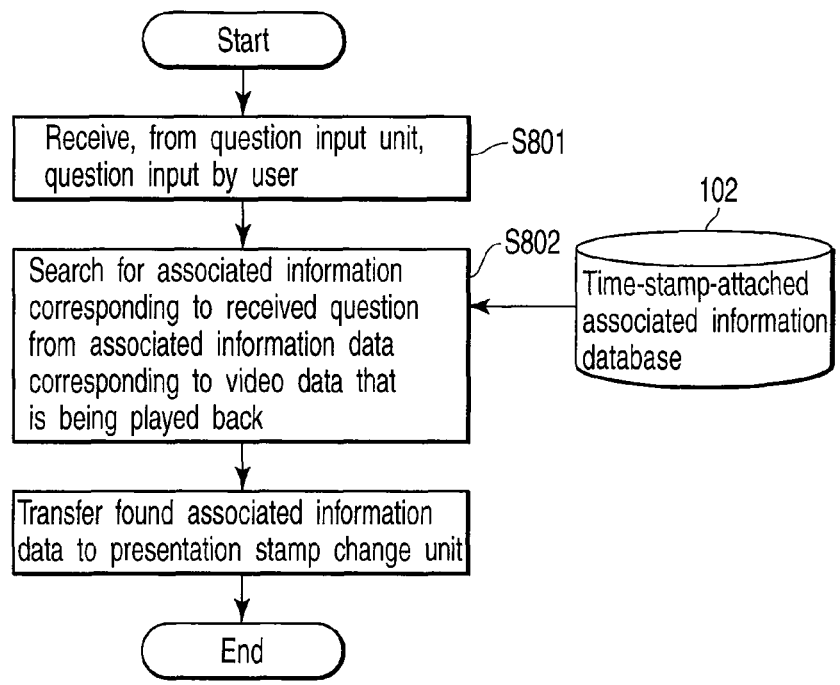
FIG. 8 is a flowchart illustrating an example of the operation of an associated information acquisition unit in FIG. 7.

FIG. 8 illustrates an example of the process sequence of the associated information acquisition unit 702 according to the second embodiment.

The associated information acquisition unit 702 receives, from the question input unit 701, a question input by the user during video playback (step S801). The question is voice data input from a microphone or text data input from, e.g., a keyboard. The associated information acquisition unit 702 refers to a time-stamp-attached associated information database 102 and searches for associated information corresponding to the received question from associated information data corresponding to the video data that is being played back (step S802). When the question is voice data, the question is converted into text by voice recognition. This enables a search for associated information by a text search technology. As in the first embodiment, associated information can be either prepared in advance or acquired by searching for external data through the Internet. In the latter case, a search is executed by using, as keywords, a word included in the user's question and a word in a closed caption corresponding to the time period when the user input the question. The subsequent process of this embodiment is the same as in the first embodiment.

According to the above-described second embodiment, it is possible to present associated information corresponding to a user's question as an answer not immediately but at a timing with a relatively small information amount in a video.

Third Embodiment

Figure 9:
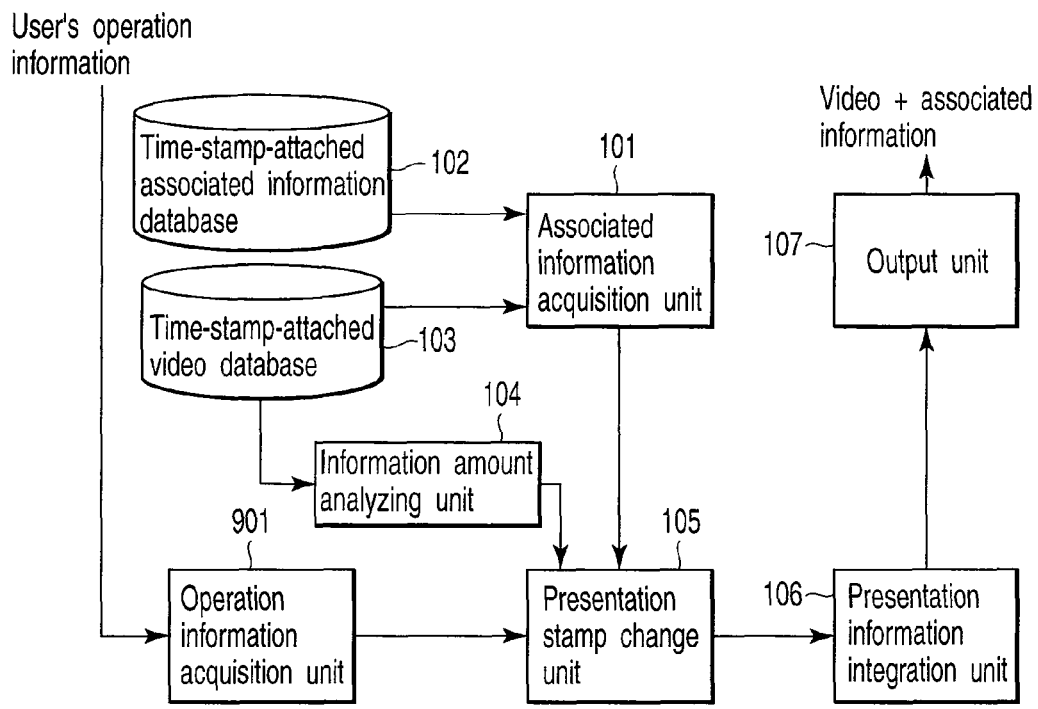
FIG. 9 is a block diagram of a video playback apparatus according to the third embodiment.

FIG. 9 is a block diagram showing the schematic arrangement of a video playback apparatus according to the third embodiment.

The arrangement of the third embodiment is different from that of the first embodiment in that the apparatus has an operation information acquisition unit 901 which acquires user's playback operation information representing whether a user is performing frame advance or fast-forward or turning on caption (subtitle) display. A presentation stamp change unit 105 decides the presentation timing using the operation information in addition to a result obtained by analyzing the video data, voice data, and closed caption of a playback target video. For example, when the user is currently performing fast-forward or frame advance, associated information presentation can be put off. The associated information is presented only when the user starts normal playback. This is because a user who is performing fast-forward or frame advance concentrates on the video itself at a high probability. If subtitle display is turned on in playing back, e.g., DVD content, the associated information presentation timing can be decided with priority on a timing with a small number of subtitles. This is because it is difficult for a user to simultaneously read the text of the subtitle and the associated information.

According to the above-described third embodiment, it is possible to decide the presentation timing in accordance with user's operation information, prevent a user from overlooking information, and reduce the load on the user in watching.

Fourth Embodiment

Figure 10:
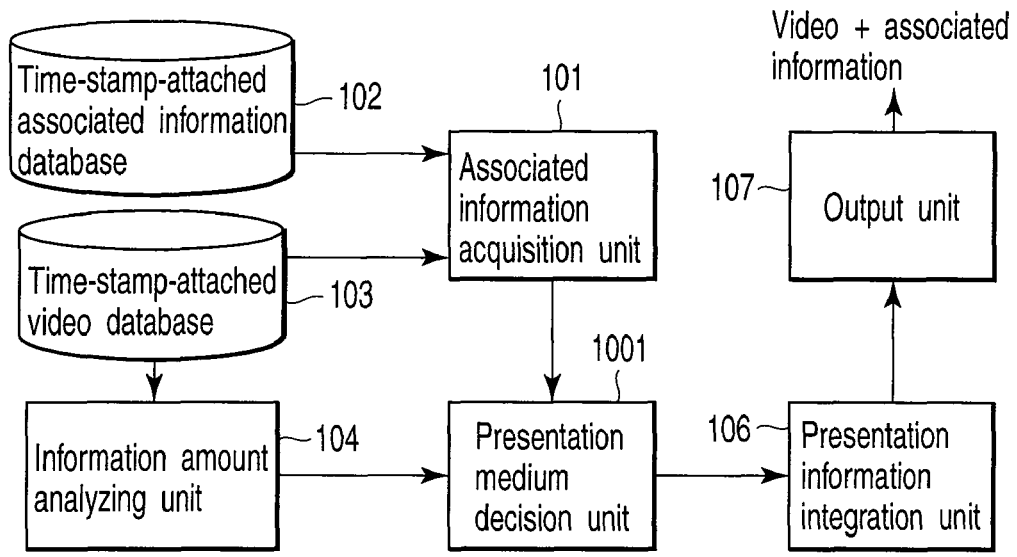
FIG. 10 is a block diagram of a video playback apparatus according to the fourth embodiment.

FIG. 10 is a block diagram showing the schematic arrangement of a video playback apparatus according to the fourth embodiment.

The arrangement of the fourth embodiment is different from that of the first embodiment in that the apparatus has a presentation medium decision unit 1001 in place of the presentation stamp change unit 105. The process contents of an associated information acquisition unit 101 and presentation information integration unit 106 are almost the same as in the first embodiment. Only the process of the presentation medium decision unit 1001 will be described herein. A presentation medium is a medium to present information to a user and includes, e.g., video display, voice output, and text display.

Figure 11:
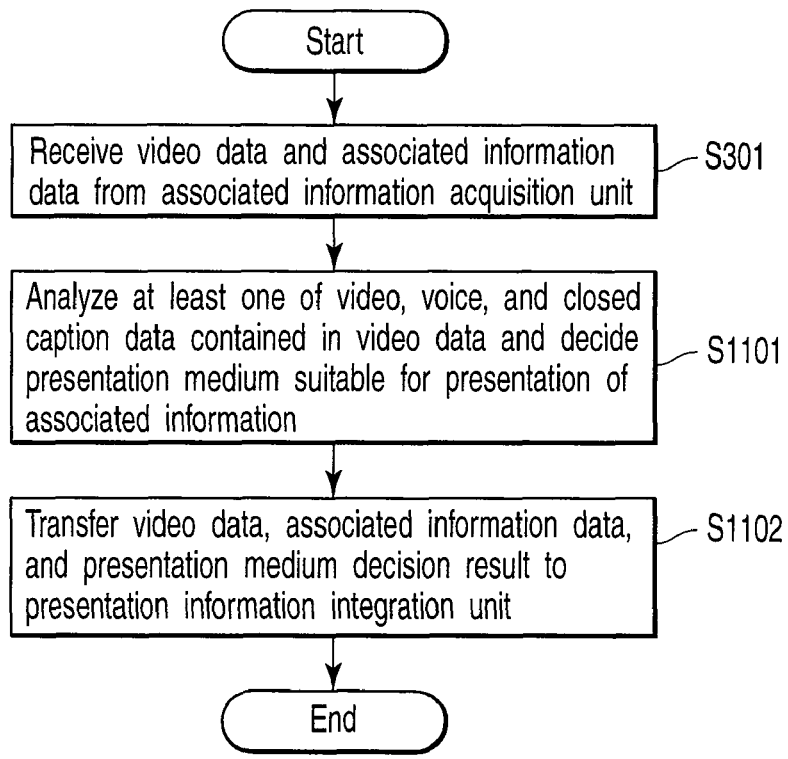
FIG. 11 is a flowchart illustrating an example of the operation of a presentation medium decision unit in FIG. 10.

The operation of the presentation medium decision unit 1001 will be described next with reference to FIG. 11.

First, the presentation medium decision unit 1001 receives video data and associated information data from the associated information acquisition unit 101 (step S301). An information amount analyzing unit 104 analyzes at least one of video information, voice information, sound information, and closed caption data contained in the video data. The presentation medium decision unit 1001 decides on the basis of the analysis result of the information amount analyzing unit 104 whether to present the associated information by text in the output screen, by voice, or in both forms (step S1101). The presentation medium decision unit 1001 transfers the video data, associated information data, and presentation medium decision result to the presentation information integration unit 106 (step S1102).

A detailed example of the associated information presentation medium decision method will be described.

To decide a presentation medium by, e.g., analyzing a video, the similarity between image frames is obtained by comparing them, as in the first embodiment, and it is determined whether the video contains many movements. If the video contains many movements, associated information is presented by voice. If the video contains few movements, associated information is presented by text. If many movements are contained, the user is busy following the video, and it is difficult for him/her to read text simultaneously. More specifically, the presentation medium decision unit 1001 measures the magnitude of movements of the video of the acquired video data. If the magnitude of movements of the video is equal to or larger than a threshold value, the presentation medium decision unit 1001 decides to present acquired associated information by voice. If the magnitude of movements of video is smaller than the threshold value, the acquired associated information is presented by text.

Alternatively, character overlay in a moving image is detected from a moving image, and associated information is presented not by text but by voice in a section with many character overlays. More specifically, the presentation medium decision unit 1001 measures the character overlay presentation time per unit time in video of the acquired video data. If the character overlay presentation time per unit time is equal to or larger than a threshold value, the presentation medium decision unit 1001 decides to present acquired associated information by voice. If the character overlay presentation time per unit time is smaller than the threshold value, the acquired associated information is presented by text.

To decide the presentation medium based on a voice, for example, associated information is presented by text in a section with many utterances in a video and by voice in a silent section or a section with only background music. Even when a closed caption is used, the presentation medium can be switched in the same way. More specifically, the presentation medium decision unit 1001 measures the output time of one of voice and sound per unit time in a video of the acquired video data. If the output time of one of voice and sound per unit time is equal to or larger than a threshold value, the presentation medium decision unit 1001 decides to present acquired associated information by text. If the output time of one of voice and sound per unit time is smaller than the threshold value, the acquired associated information is presented by voice. Some of the above-described methods may, of course, be combined.

According to the above-described fourth embodiment, it is possible to decide in accordance with the situation of a video that is being played back whether to present associated information by voice, by text, or in both forms. Hence, associated information can be presented in a form that makes the user easily grasp the information.

Fifth Embodiment

Figure 12:
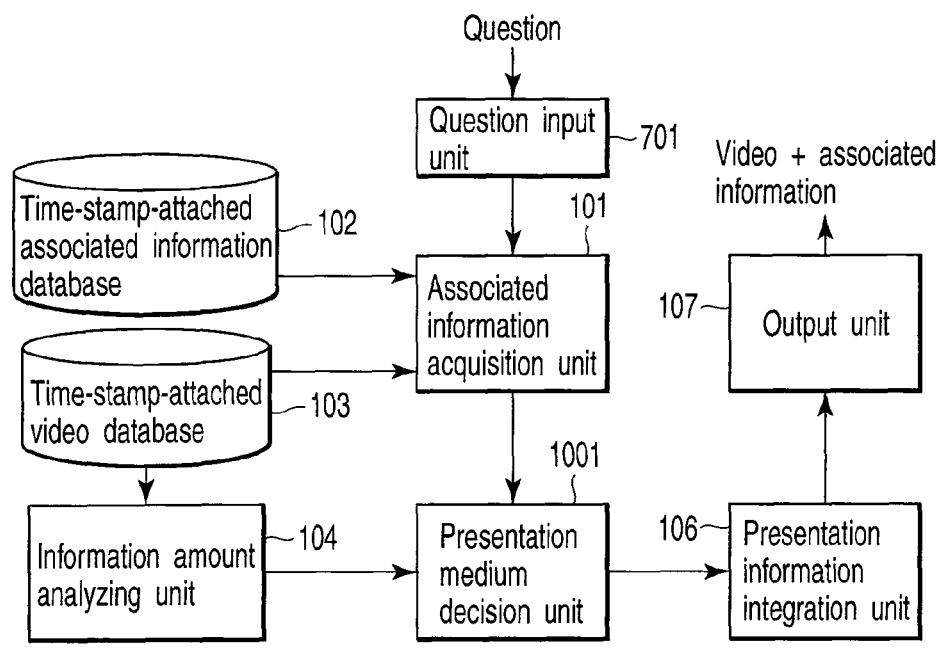
FIG. 12 is a block diagram of a video playback apparatus according to the fifth embodiment.

FIG. 12 is a block diagram showing the schematic arrangement of a video playback apparatus according to the fifth embodiment.

The arrangement of the fifth embodiment is different from that of the fourth embodiment in that the apparatus has a question input unit 701 including, e.g., a microphone or keyboard as hardware. More specifically, in the fourth embodiment, the medium to present the associated information of playback target video is decided independently of a user's question. In the fifth embodiment, a presentation medium to present associated information corresponding to a question input by a user during video playback is decided.

According to the above-described fifth embodiment, it is possible to decide in accordance with a user's question whether to present associated information corresponding to the question by voice, by text, or in both forms. Hence, associated information can be presented in a form that makes the user easily grasp the information.

Sixth Embodiment

Figure 13:
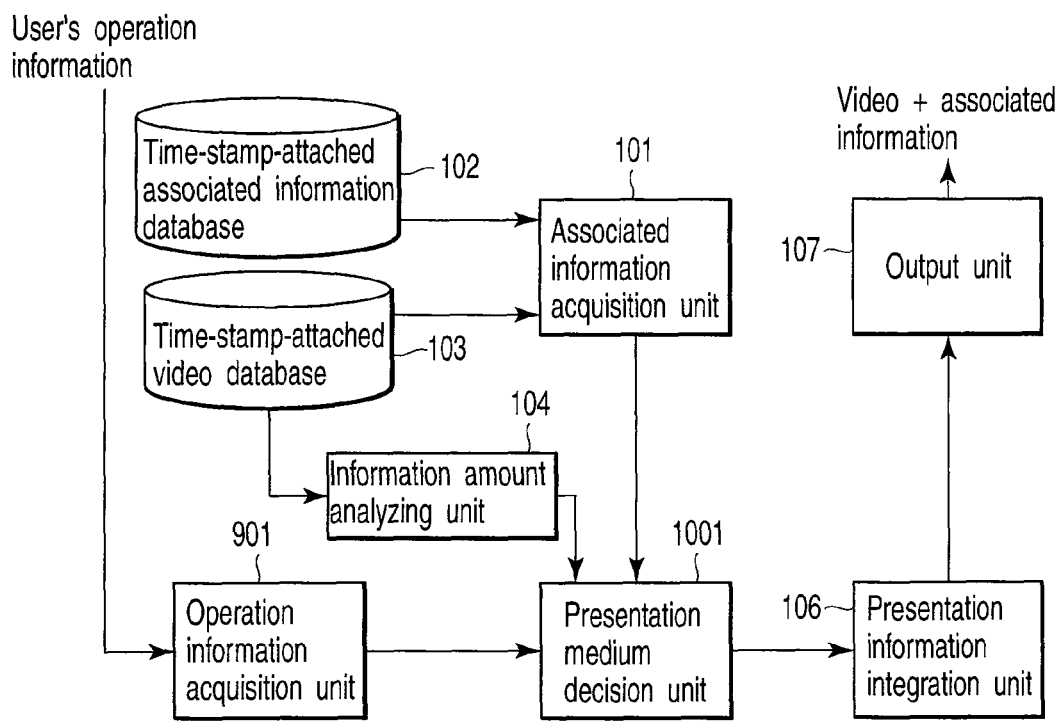
FIG. 13 is a block diagram of a video playback apparatus according to the sixth embodiment.

FIG. 13 is a block diagram showing the schematic arrangement of a video playback apparatus according to the sixth embodiment.

The arrangement of the sixth embodiment is different from that of the fourth embodiment in that the apparatus has an operation information acquisition unit 901 which acquires user's operation information representing whether a user is performing frame advance or fast-forward or turning on caption (subtitle) display. A presentation medium decision unit 1001 decides the presentation medium using the operation information in addition to a result obtained by analyzing the video data, voice data, and closed caption of a playback target video. For example, when the user is performing high-speed fast-forward, and therefore, the voice of the playback target video is not being output, associated information is presented by voice. When the user is performing low-speed fast-forward, and therefore, the voice of the playback target video is being output in a fast-forward mode, associated information is presented by text.

If subtitle display is turned on in playing back, e.g., DVD content, associated information is presented by voice. When subtitle display is off, associated information is presented by text.

According to the above-described sixth embodiment, in simultaneously presenting a video and its associated information to a user, the amount of information presented to the user at once and the medium of the information can be controlled, and the load on the user in watching can be reduced. It is therefore possible to make the user easily grasp the presented information and prevent overlooking of information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video playback apparatus comprising:
a data storage unit configured to store video data and a first video time stamp which corresponds to a playback time to play back the video data;
an information storage unit configured to store first associated information and a first associated time stamp, the first associated information being related to the video data, and the first associated time stamp corresponding to a playback time to play back the first associated information;
a data acquisition unit configured to acquire plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;
a decision unit configured to decide to present the second associated information by at least one of text and voice; and
a presentation unit configured to present the playback video data and the second associated information on the basis of the second associated time stamp and the second video time stamps, wherein
the decision unit includes a measurement unit configured to measure a magnitude of movement of video of the playback video data, and
the decision unit decides to present the second associated information by voice when the magnitude is not less than a threshold value and to present the second associated information by text when the magnitude is less than the threshold value.

2. A video playback apparatus comprising:
a data storage unit configured to store video data and a first video time stamp which corresponds to a playback time to play back the video data;
an information storage unit configured to store first associated information and a first associated time stamp, the first associated information being related to the video data, and the first associated time stamp corresponding to a playback time to play back the first associated information;

a data acquisition unit configured to acquire plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;

a decision unit configured to decide to present the second associated information by at least one of text and voice; and a presentation unit configured to present the playback video data and the second associated information on the basis of the second associated time stamp and the second video time stamps, wherein the decision unit includes a character overlay measurement unit configured to measure a character overlay presentation time per unit time in video of the playback video data, and the decision unit decides to present the second associated information by voice when the character overlay presentation time per unit time is not less than a threshold value and to present the second associated information by text when the character overlay presentation time per unit time is less than the threshold value.

3. A video playback apparatus comprising:

a data storage unit configured to store video data and a first video time stamp which corresponds to a playback time to play back the video data;

an information storage unit configured to store first associated information and a first associated time stamp, the first associated information being related to the video data, and the first associated time stamp corresponding to a playback time to play back the first associated information;

a data acquisition unit configured to acquire plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;

a decision unit configured to decide to present the second associated information by at least one of text and voice; and a presentation unit configured to present the playback video data and the second associated information on the basis of the second associated time stamp and the second video time stamps, wherein the decision unit includes a voice measurement unit configured to measure an output time of one of voice and sound per unit time in video of the playback video data, and the decision unit decides to present the second associated information by text when the output time is not less than a threshold value and to present the second associated information by one of voice and sound when the output time is less than the threshold value.

4. A video playback method comprising:

storing in a data storage unit video data and a first video time stamp which corresponds to a playback time to play back the video data;

storing in an information storage unit first associated information and a first associated time stamp, the first associated information being related to the video data, and the first associated time stamp corresponding to a playback time to play back the first associated information;

acquiring plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;

deciding to present the second associated information by at least one of text and voice; and presenting the playback video data and the second associated information on the basis of the second associated time stamp and the second video time stamps, wherein deciding to present the second associated information includes measuring a magnitude of movement of video of the playback video data, and deciding to present the second associated information decides to present the second associated information by voice when the magnitude is not less than a threshold value and to present the second associated information by text when the magnitude is less than the threshold value.

5. A video playback method comprising:

storing in a data storage unit video data and a first video time stamp which corresponds to a playback time to play back the video data;

storing in an information storage unit first associated information and a first associated time stamp, the first associated information being related to the video data, and the first associated time stamp corresponding to a playback time to play back the first associated information;

acquiring plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;

deciding to present the second associated information by at least one of text and voice; and presenting the playback video data and the second associated information on the basis of the second associated time stamp and the second video time stamps, wherein deciding to present the second associated information includes measuring a character overlay presentation time per unit time in video of the playback video data, and deciding to present the second associated information decides to present the second associated information by voice when the character overlay presentation time per unit time is not less than a threshold value and to present the second associated information by text when the character overlay presentation time per unit time is less than the threshold value.

6. A video playback method comprising:

storing in a data storage unit video data and a first video time stamp which corresponds to a playback time to play back the video data;

storing in an information storage unit first associated information and a first associated time stamp, the first associated information being related to the video data, and the first associated time stamp corresponding to a playback time to play back the first associated information;
acquiring plural playback video data to be played back and plural second video time stamps of the plural playback video data from the data storage unit on the basis of the stored video data and the first video time stamp, and acquire second associated information of the playback video data and a second associated time stamp of the second associated information from the information storage unit on the basis of the first associated information and the first associated time stamp;
deciding to present the second associated information by at least one of text and voice; and
presenting the playback video data and the second associated information on the basis of the second associated time stamp and the second video time stamps, wherein
deciding to present the second associated information includes measuring an output time of one of voice and sound per unit time in video of the playback video data, and
deciding to present the second associated information decides to present the second associated information by text when the output time is not less than a threshold value and to present the second associated information by one of voice and sound when the output time is less than the threshold value.

* * * * *